Figure 1:
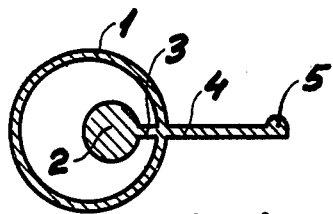

United States Patent [19]

Christensen

[11] 4,398,732
[45] Aug. 16, 1983

[54] SEALING RING

[75] Inventor: Jorn Christensen, Horsens, Denmark

[73] Assignee: Schionning & Arve' A/S, Horsens, Denmark

[21] Appl. No.: 329,278

[22] PCT Filed: May 8, 1981

[86] PCT No.: PCT/DK81/00053

§ 371 Date: Dec. 2, 1981

§ 102(e) Date: Dec. 2, 1981

[87] PCT Pub. No.: WO81/03214

PCT Pub. Date: Nov. 12, 1981

[30] Foreign Application Priority Data

May 9, 1980 [DK] Denmark ............... 2023/80

[51] Int. Cl.³ ............... F16J 15/00; F16L 21/08
[52] U.S. Cl. ............... 277/207 A; 277/226
[58] Field of Search ............... 277/207, 207 A, 208, 277/209, 226

[56] References Cited

U.S. PATENT DOCUMENTS 2,705,655 4/1953 Brown et al.
3,040,393 6/1962 Dailey ............... 277/226
3,058,752 10/1962 Miller ............... 277/207 A
3,413,406 11/1968 Plummer ............... 277/226
3,498,623 3/1970 Rowe.
3,891,224 6/1975 Ditcher.
4,170,365 10/1979 Haaland.

FOREIGN PATENT DOCUMENTS 11919 4/1979 European Pat. Off.
1285806 8/1969 Fed. Rep. of Germany.
1440198 4/1966 France.

Primary Examiner—Robert I. Smith
Attorney, Agent, or Firm—Brumbaugh, Graves, Donohue & Raymond

[57] ABSTRACT

A sealing ring of an elastic material is adapted to be applied to the spigot end of a pipe under expansion of the diameter of the ring. To obtain a particularly effective seal without any risk of overloading of the elastic material, neither during insertion into a pipe socket, assembling of the pipes nor later on as a consequence of oblique loads on the pipes, the sealing ring has a sealing member which consists of a hose (1) with a solid compression member (2) which is disposed inside the hose and is connected to the hose (1) through a flap (3). The flap has moreover an elongation (4) which can serve as a finger grip for the application of the sealing ring to the spigot end and counteract twisting of the sealing ring when the pipes are assembled.

4 Claims, 6 Drawing Figures

SEALING RING

The invention relates to a sealing ring of an elastic material, intended to be applied to the spigot end of a pipe under expansion of the ring diameter and subsequent insertion into a pipe socket of an adjoining pipe, said sealing ring consisting of a ring-shaped hose in whose cavity there is provided a solid compression member which is connected to the hose.

Ever greater demands are being made on this type of sealing rings, partly in relation to the effective seal and partly in relation to the load on the elastic material; for such a seal to have a satisfactory durability it must be completely certain that the material is not overloaded even under extreme conditions, e.g. in case of oblique loads or when the pipe sections are assembled.

The object of the present invention is to provide an embodiment of such a sealing ring which meets the most stringent demands in respect of these quality requirements and also facilitates correct fitting of the sealing ring.

The invention also aims at avoiding the tendency of inadvertent twisting of the sealing ring which causes great inconvenience when the ring is applied and when the pipe sections are assembled, as is the case with already known sealing rings of the present type.

This is achieved according to the invention in that the compression member is connected to the hose through a flap which is short in cross-section so that the compression member is disposed as excentrically as possible with respect to the hose which has a thin collapsible wall, said flap having an elongation that extends beyond the hose.

The advantage of such an embodiment of the sealing ring is in the first place that the sealing ring can in a specific and correct manner be pulled on to the spigot end of a pipe under expansion of the sealing ring itself. Thus, it is unmistakable how the sealing is to be used, and twisting of the ring is avoided with great certainty because the said elongation serves as a finger grip for the application of the sealing ring to the spigot end of a pipe and also counteracts any tendency of the ring being twisted when a pipe socket is slid over the sealing ring. Moreover, when the pipe socket is slid over the sealing ring, the hose rolls across the compression member and thus forms a double layer which provides for suitable resiliency in relation to radial and particularly axial displacements of the two pipe sections, simultaneously with the compression member, totally surrounded by the hose, giving a very safe seal without any risk of overloading of the material; of course the dimensions of the pipe socket and the spigot end have to be adapted so as to provide for a clamping force of a desired order.

As the hose is usually made quite open, it is moreover expedient according to the invention that the hose has been collapsed, e.g. by exhaustion, from its original, substantially circular cross-section so as to substantially tightly surround the solid compression member, the advantage being that there will be no compression of air within the hose which might result in an uncertain load and a risk of deterioration of the sealing effect after an extended period of time.

It is also expedient according to the invention that the outer edge of the said elongation serving as a finger grip is provided with a bead-like thickened area, which makes the finger grip itself more effective and also provides for a significant improvement in the counteraction against twisting of the ring when the pipe socket is slid over the ring.

A particular embodiment of the sealing ring of the invention is characterized in that said bead-like thickened area has substantially the same thickness as the compression member, said elongation of the short flap connected to the compression member having approximately the same length as the flap itself. In such an embodiment the said bead-like thickened area serves as a supplementary solid compression member which additionally improves the efficiency of the sealing ring as regards twisting during assembling operations and tightness in respect of assembled pipes. This embodiment is particularly useful where the ring is to be fitted on spigot ends without shoulders.

Figure 4:
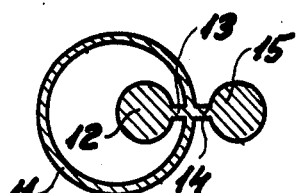
Figure 2:
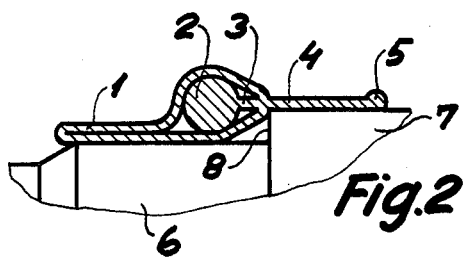
Figure 5:
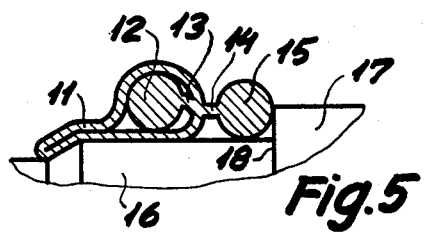
Figure 3:
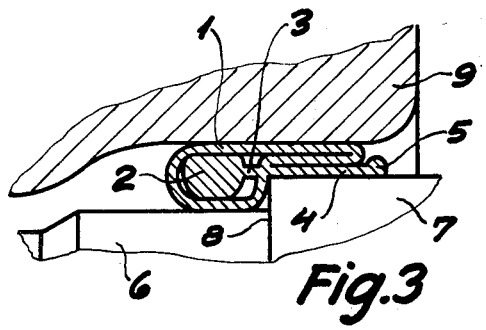
Figure 6:
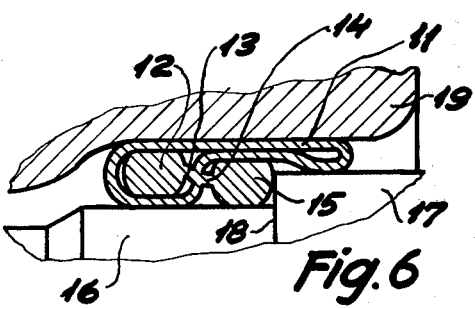

The invention will be explained more fully below with reference to the drawing, in which FIG. 1 shows a cross-section of an extruded sealing ring according to the invention, FIG. 2 shows the same sealing ring after exhaustion of the hose and mounting on the spigot end of a pipe, FIG. 3 shows the same sealing ring, inserted into a pipe socket, FIG. 4 shows an amended embodiment in an extruded state, FIG. 5 shows this embodiment after exhaustion of the hose and mounting on the spigot end of a pipe, and FIG. 6 shows the same sealing ring, inserted into a pipe socket.

FIG. 1 shows the cross-section of a sealing ring which consists of a hose 1 in whose cavity there is provided a compression member 2 connected to the hose through a short flap 3 that has an elongation 4 outside the hose, said elongation serving as a finger grip and having a bead-like thickened area 5 on its outer end.

FIG. 2 shows the same sealing ring after the hose has been exhausted and the sealing ring has been fitted on the spigot end 6 of a pipe 7. The sealing ring has been pulled on to the spigot end 6 by means of the elongation 4 so as to lie tightly around said end after having been expanded a little, and therefore the hose itself will tightly engage the spigot end and the compression member 2, surrounded by the hose, can engage a shoulder 8, which is often provided at the transition from the spigot end to the pipe proper.

FIG. 3 shows the same sealing ring after the spigot end has been inserted into a pipe socket 9, whereby the hose 1 has been rolled across the compression member 2 and engages the elongation 4 in a double layer so that it terminates closely adjacent to the bead-like thickened area 5. The compression member 2 is enveloped in the hose 1 and forms the seal proper between the spigot end 6 and the pipe socket 9.

The embodiment shown in FIGS. 4, 5 and 6 comprises, like the embodiment described in the foregoing, a hose 11 in which there is provided a compression member 12 connected to the hose 11 through a short flap 13 that has an elongation 14, which here is quite short and terminates in a bead-like thickened area 15 of substantially the same thickness as the compression member 12.

After exhaustion of the hose and mounting on the spigot end of a pipe, the bead-like thickened area 15 can, as shown in FIG. 5, engage a shoulder 18 at the transition between the spigot end 16 and the pipe 17 itself, and when the spigot end is then inserted into a pipe socket, the hose 11 rolls, as shown in FIG. 6, across the bead-like thickened area 15, and the hose 11 together with the compression member 12 and the bead-like thickened area 15 thus forms an effective double seal, and at the same time the outer end of the hose 11 is comparatively loose between the pipe socket 19 and the pipe 17 and provides effective protection there against excessive radial mutual displacements of the pipes. However, the shoulder 18 is not of great importance to the mode of operation of the sealing ring in this embodiment.

I claim:

1. A sealing ring of an elastic material, intended to be applied to the spigot end of a pipe under expansion of the ring diameter and subsequent insertion into a pipe socket of an adjoining pipe, said sealing ring consisting of a ring-shaped hose in whose cavity there is provided a solid compression member which is connected to the hose, characterized in that the compression member is connected to the hose through a flap which is short in cross-section so that the compression member is disposed as excentrically as possible with respect to the hose which has a thin collapsible wall, said flap having an elongation that extends beyond the hose.

2. A sealing ring according to claim 1, characterized in that the hose has been collapsed, e.g. by exhaustion, from its original substantially circular cross-section so as to substantially tightly surround the solid compression member.

3. A sealing ring according to claim 1 or 2, characterized in that the outer edge of said elongation is provided with a bead-like thickened area.

4. A sealing ring according to claim 3 characterized in that said bead-like thickened area has substantially the same thickness as the compression member, said elongation of the short flap connected to the compression chamber having approximately the same length as the flap itself.

* * * * *